July 3, 1951  C. G. LUDEMAN  2,559,219

DETECTION AND MEASUREMENT OF PENETRATIVE RADIATION

Filed March 12, 1949

INVENTOR.
CLIFFORD G. LUDEMAN
BY
ATTORNEYS

Patented July 3, 1951

2,559,219

UNITED STATES PATENT OFFICE 2,559,219

DETECTION AND MEASUREMENT OF PENETRATIVE RADIATION

Clifford G. Ludeman, Scarsdale, N. Y., assignor to Texaco Development Corporation, New York, N. Y., a corporation of Delaware Application March 12, 1949, Serial No. 81,098

7 Claims. (Cl. 250—71)

This invention relates to the detection and measurement of penetrative radiation such as gamma rays and more particularly to phosphor elements for such purposes.

Certain substances such as naphthalene, zinc sulfide, and zinc silicate have been found to possess the property of converting penetrative radiation such as gamma rays to radiation in other ranges of the spectrum such as the ultraviolet range and the visible light range. Such substances are called phosphors and their utilization in the detection of such penetrative radiation has been practiced to some extent. In the more simpler arrangements, the phosphor is subjected to penetrative radiation, the converted radiation radiated from the phosphor being detected and measured in an electron multiplier of the tube type.

The use of such phosphors or fluorphors has been limited in many particulars. For instance, it is necessary that the dimension of each phosphor be kept below a certain critical dimension. This dimension is usually considered to be the maximum dimension at which the radiation generated or developed in the phosphor can escape therefrom and above which the phosphor will absorb such radiation so that the amount of radiation discharged from the phosphor corresponds to only that generated within the critical dimension as measured from the radiating surface. A further limitation is found in the fact that some phosphors such as naphthalene, anthracene and scheelite, are not in convenient physical forms for handling or for shaping as desired.

In overcoming the aforesaid disadvantages and in providing an improved phosphor or fluorescent element, it is an object of the invention to provide a phosphor element wherein the dimension as respects the self-absorption thereof for the radiation generated therein is not limiting and the element can be employed in almost any mass desired.

Another object of the invention is the provision of a novel phosphor element which can be shaped as desired and accommodated to any particular use in a manner to function with maximum efficiency.

Other objects and advantages of the invention will appear from the following description and claims taken in connection with the attached drawings wherein:

In brief, the present invention is directed to a phosphor element, capable of converting one type of radiation to another, the element including a phosphor per se distributed as a solid or liquid and as a dispersion or a solute, or both in a matrix of a material capable of being shaped as desired and capable of conducting the radiation developed in the phosphor, the phosphor element having at least one section such as a face for exposure to and interception of the penetrative radiation to be detected and measured, and at least one second section such as a face for exposure to a detecting and measuring device capable of detecting and measuring the converted radiation, said sections being spaced from one another to insure exposure of the penetrative radiation to a substantial portion of the volume of the phosphor element with subsequent conversion of the intercepted penetrative radiation to radiation capable of being more easily detected and measured. The last named material may be employed in a liquid or solid phase.

Figure 1:
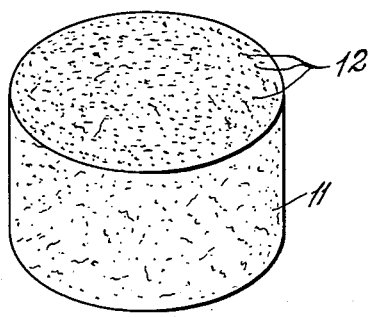
Fig. 1 represents a phosphor element wherein the phosphor is combined with a solid conductor in a solid phase.

Fig. 1 illustrates a relatively simple embodiment of the invention wherein a phosphor 12 of originally relatively small amount and having of itself relatively small effective dimensions for the interception and conversion of penetrative radiation to more easily detectable and measurable radiation in other ranges of the spectrum is shown dispersed as a solid in a casting 11 of a suitable material for conducting the radiation emitted by the dispersed phosphor masses, the original relatively small effective dimensions of the original phosphor material for the interception and conversion of penetrative radiation being enlarged to the large volume or dimensions of the matrix or resultant phosphor element. Such an element can be formed by dispersing the phosphor masses in a suitable conductor while in a liquid phase, the resultant mixture being thereafter cast and caused to harden in well-known manner. While the phosphor masses are shown in the drawing as substantially uniformly dispersed, it is to be understood that they may be disposed otherwise in the conductor material. For instance, the phosphor masses may be concentrated along the faces of the matrix or at the center thereof. Any arrangement or design found most suitable for a particular use of the phosphor element can be used, the phosphor element being considered to be that portion of the matrix in which the phosphor is distributed.

Suitable phosphors are of both the inorganic and organic types. Typical inorganic phosphors are natural or synthetic calcium tungstate, zinc sulfide and zinc silicate, or mixtures thereof. Typical organic phosphors include benzoic acid and polynuclear aromatics such as naphthalene, anthracene or diphenyl and mixtures of the foregoing. Phosphors of the above types and their properties are known. They possess the unique characteristic of being able to convert penetrative radiation such as gamma rays to radiation in other ranges of the spectrum such as the ultraviolet and visible light ranges which is more easily detectable and measurable directly by relatively simple means.

Radiation conductors which have been found excellent for support of the phosphor include polystyrene and polymerized methyl methacrylate, the latter being commercially available under the trade names of Lucite, Plexiglas and Crystallite. A polyester now being commercially sold as Castolite has also been used.

The phosphor and the conductor may be combined in a liquid or solid phase or in a gel-like or semi-solid phase. In Fig. 1 wherein particles of the phosphor are visible, the phosphor has been added to the conductor material in excess of any solubility it may have in the conductor, the two being subsequently cast together to form a solid element.

Figure 2:
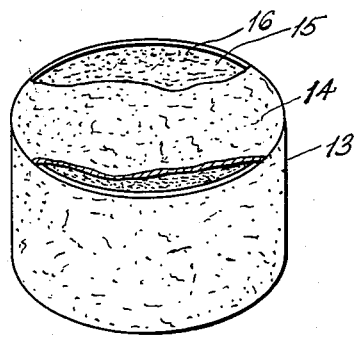
Fig. 2 is a perspective of a phosphor element similar to that of Fig. 1 wherein the conductor component is in a liquid phase.

In Fig. 2, a container 13 having a cover 14, both preferably of conducting material, is shown with the same or a different conductor 15 in the liquid phase contained therein, the phosphor particles 16 being suspended therein. While there may be some tendency for the phosphor particles to settle, this settling may be overcome by shaking the container at intervals. Any tendency to settle can be reduced by using a conductor of high viscosity and reducing the phosphor to fine particle size.

While the phosphor has been shown in Figs. 1 and 2 in the form of finely divided masses, it is to be understood that a single mass of the phosphor or a multiplicity of masses of larger size can be used. The sizes of the individual masses will depend upon the aforesaid critical dimension and the desirability of avoiding any interference with the escape of radiation from the phosphor elements. Stated otherwise, it is desirable not to have a density of phosphor particles such that one or more particles may interfere with the discharge of radiation generated in another particle. Obviously the critical dimension will vary with each specific phosphor and can readily be determined.

Preferably the phosphor is divided into relatively fine particles which admits of better and more homogeneous dispersion throughout the conductor in either the liquid or solid phase. If the phosphor be completely or partially soluble in the conductor, the desired homogeneity is even more complete.

A marked advantage of such a phosphor element is the ability to form it in almost any dimension without regard to the critical dimension of the phosphor, thereby enabling the element to be used more efficiently.

Figure 3:
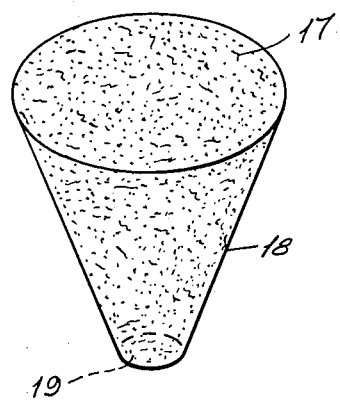
Fig. 3 represents a phosphor element similar to that of Fig. 1 but of different shape.

A further advantage of the phosphor element of this invention is evident from Fig. 3 wherein an element has been cast, machined or otherwise formed in the shape of a truncated cone having a section such as a face 17 open or exposed to a penetrative radiation to be determined and a conical side wall 18 which terminates in a small section such as a face 19, preferably of a size and shape approximating the detecting and measuring element such as the cathode of an electron multiplier of the tube type and arranged to be disposed there adjacent. A typical tube type is the one designated 931A (931A, 1P21, or 1P28) now being manufactured and sold by Radio Corporation of America.

The side walls of the cone may be coated with a material capable of reflecting the generated radiation back into the conducting element so that it is eventually discharged at face 19, silver, aluminum or cadmium being effective for such purposes. If the conductor has a sufficiently high refractive index, such a coating may be omitted to avoid adsorption of the radiation by the coating.

Obviously many modifications and variations of the invention as hereinabove set forth may be made without departing from the spirit and scope thereof and only such limitations should be imposed as are indicated in the appended claims.

I claim:

1. A phosphor element for use in the detection and measurement of penetrative radiation such as gamma rays comprising a phosphor material in relatively small amount having of itself relatively small effective dimensions for the interception and conversion of penetrative radiation to more easily detectable and measurable radiation in other ranges of the spectrum, and a matrix of relatively large volume capable of conducting said last-named radiation, said phosphor material being substantially homogeneously distributed throughout said matrix whereby the original relatively small effective dimensions of said phosphor material for the interception and conversion of penetrative radiation are enlarged to the volume of said matrix, the element formed by said phosphor material and said matrix being formed with at least one section for exposure to and interception of penetrative radiation and at least one second section for exposure to a detecting and measuring device capable of detecting and measuring the converted radiation, said first and second sections being spaced from one another to insure exposure of the penetrative radiation to a substantial portion of the volume of said element.

2. The phosphor element of claim 1 wherein said element excepting said second section is surrounded by a reflector for said converted radiation.

3. The phosphor element of claim 1 wherein said matrix is formed of polystyrene.

4. The phosphor element of claim 1 wherein said matrix is formed of polymerized methyl methacrylate.

5. The phosphor element of claim 1 wherein said matrix is in the liquid phase.

6. A phosphor element for use in the detection and measurement of penetrative radiation such as gamma rays comprising a phosphor material in relatively small amount having of itself relatively small effective dimensions for the interception and conversion of penetrative radiation to more easily detectable and measurable radiation in other ranges of the spectrum, and a matrix of relatively large size capable of conducting said last-named radiation, said phosphor material being substantially homogeneously distributed throughout said matrix whereby the original relatively small effective dimensions of the phosphor material for the interception and conversion of penetrative radiation are extended and enlarged to the dimensions of said matrix, the element formed by the phosphor material and the matrix being formed with a relatively large section for exposure to and interception of penetrative radiation and a relatively small section for exposure to a detecting and measuring device capable of detecting and measuring the converted radiation, said element being shaped between said sections to concentrate said converted radiation for discharge from said second section to said detecting and measuring device.

7. A phosphor element for use in the detection and measurement of penetrative radiation such as gamma rays comprising a phosphor material in relatively small amount having of itself relatively small effective dimensions for the interception and conversion of penetrative radiation to more easily detectable and measurable radiation in other ranges of the spectrum, and a matrix in the solid phase and of relatively large volume capable of conducting said last-named radiation, said phosphor material being substantially homogeneously distributed throughout said matrix whereby the original relatively small effective dimensions of said phosphor material for the interception and conversion of penetrative radiation are enlarged to the volume of said matrix, the element formed by said phosphor material and said matrix being formed with at least one section for exposure to and interception of penetrative radiation and at least one second section for exposure to a detecting and measuring device capable of detecting and measuring the converted radiation, said first and second sections being spaced from one another to insure exposure of the penetrative radiation to a substantial portion of the volume of said element.

CLIFFORD G. LUDEMAN.

REFERENCES CITED

The following references are of record in the file of this patent:

UNITED STATES PATENTS

| Number | Name | Date |
|---|---|---|
| 2,383,067 | Macht | Aug. 21, 1945 |
| 2,436,182 | Schmidling | Feb. 17, 1948 |
| 2,475,529 | Switzer et al. | July 5, 1949 |

OTHER REFERENCES

Atomic Energy Commission document: "Scintillation Counting With Anthracene," Apr. 20, 1948, 6 pages.